US008889002B2

(12) United States Patent
Mohr et al.

(10) Patent No.: US 8,889,002 B2
(45) Date of Patent: Nov. 18, 2014

(54) CLEANING AND MATERIAL SEPARATING DEVICE FOR WASTEWATER, PARTICULARLY FROM LIVESTOCK HUSBANDRY

(75) Inventors: Frank Mohr, Eddelak (DE); Gerhard Krüger, Hamburg (DE)

(73) Assignee: Entwicklungsges. Frank Mohr U. Gerhard Kreger, Jun.GBR, Eddelak (DE)

( * ) Notice: Subject to any disclaimer, the term of this patent is extended or adjusted under 35 U.S.C. 154(b) by 838 days.

(21) Appl. No.: 13/122,804

(22) PCT Filed: Oct. 7, 2009

(86) PCT No.: PCT/EP2009/007300
§ 371 (c)(1),
(2), (4) Date: Apr. 6, 2011

(87) PCT Pub. No.: WO2010/040563
PCT Pub. Date: Apr. 15, 2010

(65) Prior Publication Data
US 2011/0192777 A1  Aug. 11, 2011

(30) Foreign Application Priority Data
Oct. 7, 2008 (DE) .......................... 10 2008 050 223

(51) Int. Cl.
*C02F 9/00* (2006.01)
*C02F 1/38* (2006.01)
(Continued)

(52) U.S. Cl.
CPC ... *C02F 1/38* (2013.01); *B03B 5/32* (2013.01); *B01F 2003/04652* (2013.01); *C02F 2303/02*
(Continued)

(58) Field of Classification Search
CPC .............. C02F 1/38; C02F 1/385; C02F 1/78; C02F 9/00; C02F 11/06; C02F 2103/003; C02F 2103/20; C02F 2201/78; C02F 2201/782; C02F 2201/784; B01F 3/04099; B01F 3/04106; B01F 3/04531; B01F 3/04539; B01F 3/04602; B01F 3/04595; B01F 3/04609; B01F 3/04619
USPC .............. 210/760, 174, 192, 198.1, 205, 219, 210/220, 221.2, 253, 259, 297, 324, 326, 210/345, 512.1; 216/121.1, 123, DIG. 42
See application file for complete search history.

(56) References Cited

U.S. PATENT DOCUMENTS 4,298,467 A * 11/1981 Gartner et al. ............... 210/96.1
4,430,306 A    2/1984  Namba et al.
(Continued)

FOREIGN PATENT DOCUMENTS

DE    1 143 761    2/1963
DE    1 960 953    12/1970
(Continued)

OTHER PUBLICATIONS

Friedmund Rüb: "Vielseitige Möglichkeiten der Behandlung von Wasser und Luft mit Ozon", in "Wasser, Luft und Betrieb" (*Water, Air and Operation*), vol. 19 (1975) No. 4, pp. 147-152.

*Primary Examiner* — Lucas Stelling
(74) *Attorney, Agent, or Firm* — Henry M. Feiereisen LLC

(57) ABSTRACT

The invention relates to a device for cleaning fluid media containing particulate matter, particularly from livestock husbandry, by means of ozonization in a closed ozonization container (11) and subsequent separation of the particulate matter portions. A vertically extending hollow cylindrical fixture (17) is disposed in the closed ozonization container (11). The fixture (17) is operatively connected to a rotating agitator shaft (16), wherein agitation means (18, 19) are associated with the agitator shaft (16), and the fixture (17) is equipped with supply lines (22, 23) by means of which ozone can be fed.

7 Claims, 4 Drawing Sheets

(51) Int. Cl.
  *C02F 1/78* (2006.01)
  *B03B 5/32* (2006.01)
  *B01F 7/22* (2006.01)
  *B04B 3/00* (2006.01)
  *B04B 11/06* (2006.01)
  *B04B 1/00* (2006.01)
  *B01F 3/04* (2006.01)
  *C02F 103/00* (2006.01)
  *C02F 101/30* (2006.01)
  *C02F 103/20* (2006.01)

(52) U.S. Cl.
  CPC .......... (2013.01); *B01F 7/22* (2013.01); *C02F 2103/008* (2013.01); *C02F 2303/24* (2013.01); *B04B 3/00* (2013.01); *B01F 2003/04673* (2013.01); *B04B 11/06* (2013.01); *C02F 2101/30* (2013.01); *B01F 3/04609* (2013.01); *B04B 1/00* (2013.01); *C02F 1/78* (2013.01); *B01F 2003/04886* (2013.01); *C02F 2303/26* (2013.01); *C02F 2103/20* (2013.01)
  USPC .......... 210/205; 210/209; 210/219; 210/220; 210/259; 210/512.1

(56) References Cited

U.S. PATENT DOCUMENTS

| | | | |
|---|---|---|---|
| 5,711,902 A * | 1/1998 | Hsu | 261/91 |
| 6,216,875 B1 | 4/2001 | Stone | |
| 6,460,830 B1 | 10/2002 | Boulant | |
| 6,755,973 B2 * | 6/2004 | Allen | 210/636 |
| 2007/0290380 A1 | 12/2007 | Avrillier et al. | |

FOREIGN PATENT DOCUMENTS

| | | |
|---|---|---|
| DE | 29 20 010 | 11/1980 |
| EP | 1 433 754 | 6/2004 |
| GB | 1 221 022 | 2/1971 |
| GB | 1 296 387 | 11/1972 |
| GB | 1 427 614 | 3/1976 |
| WO | WO 91/12209 | 8/1991 |
| WO | WO 2005/035128 | 4/2005 |
| WO | WO 2005/061396 | 7/2005 |
| WO | WO 2005/065389 | 7/2005 |
| WO | WO 2006/104759 | 10/2006 |
| WO | WO 2008/063992 | 5/2008 |

* cited by examiner

CLEANING AND MATERIAL SEPARATING DEVICE FOR WASTEWATER, PARTICULARLY FROM LIVESTOCK HUSBANDRY

CROSS-REFERENCES TO RELATED APPLICATIONS

This application is the U.S. National Stage of International Application No. PCT/EP20091007300, filed Oct. 7, 2009, which designated the United States and has been published as International Publication No. WO 2010/040563 and which claims the priority of German Patent Application, Serial No. 10 2008 050 223.5, filed Oct. 7, 2008, pursuant to 35 U.S.C. 119(a)-(d).

BACKGROUND OF THE INVENTION

Device for cleaning fluid media containing particulate matter, particularly from livestock husbandry, through ozonization in a closed ozonizing container and subsequent separation of the particulate matter portions.

Wastewater from livestock husbandry containing feces, namely liquid manure, is typically collected in storage tanks and after the harvest deployed on farmland as natural fertilizer. As a result, a significant amount of unpleasant odor is generated in the environment.

Such wastewater collection occurs also onboard ships. More particularly, a significant amount of wastewater is produced onboard large seagoing vessels, in particular cruise ships, which cannot and must not simply be discarded overboard. As a result, a commensurately large tank storage space must be provided.

DE 29 20 010 A1 discloses removing contaminants in ground water and surface water with ozone. In this way, wastewater with natural contaminants or contaminants stemming from production processes of the chemical industry is cleaned.

A method for condensing and freezing water vapor from a gas mixture disclosed in DE-OS 1 960 953 is in employed in systems used to precipitate a particular component, for example sulfur dioxide, from a gas mixture, wherein the cold residual gas is used for heat exchange with supplied hot and unprocessed gas, and the gas mixture is supposedly relatively free of water before entering the condenser. It is known from DE-OS 2 025 523 to perform volumetric measurements for monitoring and controlling chemical treatment baths.

The publication "Wasser, Luft und Betrieb" (*Water, Air and Operation*), 19 (1975) No. 4, p. 147-152 discloses the use of ozone for the treatment of water and air. DE-AS 10 62 394 discloses a method and an apparatus for removing odor from air, in particular from industrial waste gases, with ozone, which in essence consists of an inlet tube with a Venturi nozzle. The contaminated air is mixed via the inlet tube with ozone in a mixing device, wherein the ozone is suctioned from an ozinator by a vacuum created at the Venturi nozzle of the inlet tube.

U.S. Pat. No. 4,430,306 discloses an apparatus for recovering oxygen after ozonizing reactions. To this end, $O_2$ which is not consumed in an ozonizing reaction is supplied to a drying tower where contaminants such as water, organic contaminants and $CO_2$ are absorbed on zeolites. The cleaned oxygen is returned to the ozinator for increasing the ozone yield.

GB 1 427 614 C1 describes a method and an apparatus capable of cleaning contaminated, in particular foul air by applying ozone. Ozone-saturated moist air and very fine ozone-saturated water droplets are blown into the contaminated gases, wherein the ozone concentration can be continuously measured and regulated.

While all these methods and apparatuses are used for removing noxious odors caused by contaminated wastewater, the contaminated wastewater must be intermediately stored in relatively large tank vessels and the ozone consumption is relatively high. This requires significant storage space which is generally not unlimited, in particular on ships. Moreover, they are not suited to remove the sources from the wastewater at reasonable costs and to keep the required intermediate storage space as small as possible.

It is an object of the invention to provide a device for removing contaminants from liquid media, which minimizes the ozone consumption and which is capable of cost-effectively removing the suspended particles causing the unpleasant odors.

SUMMARY OF THE INVENTION

This object is attained with a device for cleaning liquid media containing particulate matter, in particular from animal husbandry, wherein the device includes a closed ozonizing container in which the liquid media containing particulate matter is ozonized and the particulate matter fraction is subsequently separated, a vertical hollow-cylindrical fixture arranged in the closed ozonizing container, a rotatable agitator shaft having two ends and being operatively connected to the fixture, agitation means cooperating with the agitator shaft, and ozone feed lines connected to the fixture for introduced ozone into the closed ozonizing container.

The device according to the invention includes a closed ozonizing container, in which vertical hollow-cylindrical fixtures are arranged, the fixtures are operatively connected with a rotatable agitator shaft, with agitation means associated with the agitator shaft, and the fixtures are provided with feed lines through which ozone can be introduced.

An advantageous embodiment of the invention has a closed ozonizing container in which a vertical hollow-cylindrical fixture which is open on both ends is arranged, with a rotatable agitator shaft passing through the fixture and a agitating propeller being associated with both ends of the agitator shaft, wherein the fixture is provided with a ring-shaped line through which the ozone can be introduced into the hollow-cylindrical fixture; the closed ozonizing container is preferably spherical.

The device according to the invention can therefore very effectively neutralize constituents in the wastewater that cause unpleasant odors at low costs.

According to another advantageous embodiment of the invention, a conventional stator is provided in the ozonizing container on the bottom end of the agitator shaft, in which a very fast rotating rotor is arranged as agitation means. The agitator shaft is supported on its top end in a bearing flange and is driven by an electric motor.

With this embodiment, relatively high shearing forces are generated with which particulate matter lumps suspended in the medium to be cleaned can be broken down and the medium can be homogenized.

In the device according to the invention, the ring-shaped line for introducing ozone is arranged in the region of the bottom opening of the hollow-cylindrical fixture. These measures ensure that the wastewater intensively interacts with the ozone and is effectively aerated with the gas.

In another advantageous embodiment of the device according to the invention, the ring-shaped line includes nozzles oriented radially into the fixture. Particularly fine ozone bubbles can be generated with this arrangement. As a result of the increased surface area, the reactive surface of the wastewater also increases which shortens the application time of the ozone and hence also shortens the process.

In a particularly advantageous embodiment of the device according to the invention, the agitator propellers arranged on both ends produce a flow in the fixture. The wastewater is thereby permanently kept in motion, so that larger solid components are unable to settle.

It is also ensured that heavy solid components are kept suspended in the wastewater and are prevented from lumping together and settling, which would remove them from the interaction with the ozone.

In another preferred embodiment of the device according to the invention, a closed material separating container, into which the wastewater that was previously treated with ozone in the ozonizing container can be transferred by pumping, is arranged downstream of the closed container. The wastewater pumped from the closed ozonizing container is centrifuged in the material separating container. The heavier flocculated particulate matter is transported to the outside into catch bags for heavy materials, where they are collected and optionally separated. The remaining and now clean wastewater can be readily disposed of.

According to an embodiment according to the invention, the catch bags for heavy materials have discharge flaps which open downward. The flocculated separated heavy materials can then be removed and intermediately stored without taking up much space. The volume of the contaminants which must be intermediately stored for proper disposal can thereby be significantly reduced.

In another preferred embodiment of the device according to the invention, a conventional material separating device is used for separating the suspended particles from the homogenized ozonized medium. The material separating device essentially includes a horizontal housing with an inlet for the medium to be cleaned, wherein a receiving drum which consists of a cylindrical drum part and a conical drum part is disposed inside the housing; a feed screw which is operatively connected with the interior surface of the conical drum part is arranged in the receiving drum.

BRIEF DESCRIPTION OF THE DRAWING

Exemplary embodiments of the invention will now be described with reference to the appended drawing, which shows in.

DETAILED DESCRIPTION OF PREFERRED EMBODIMENTS

Figure 1:
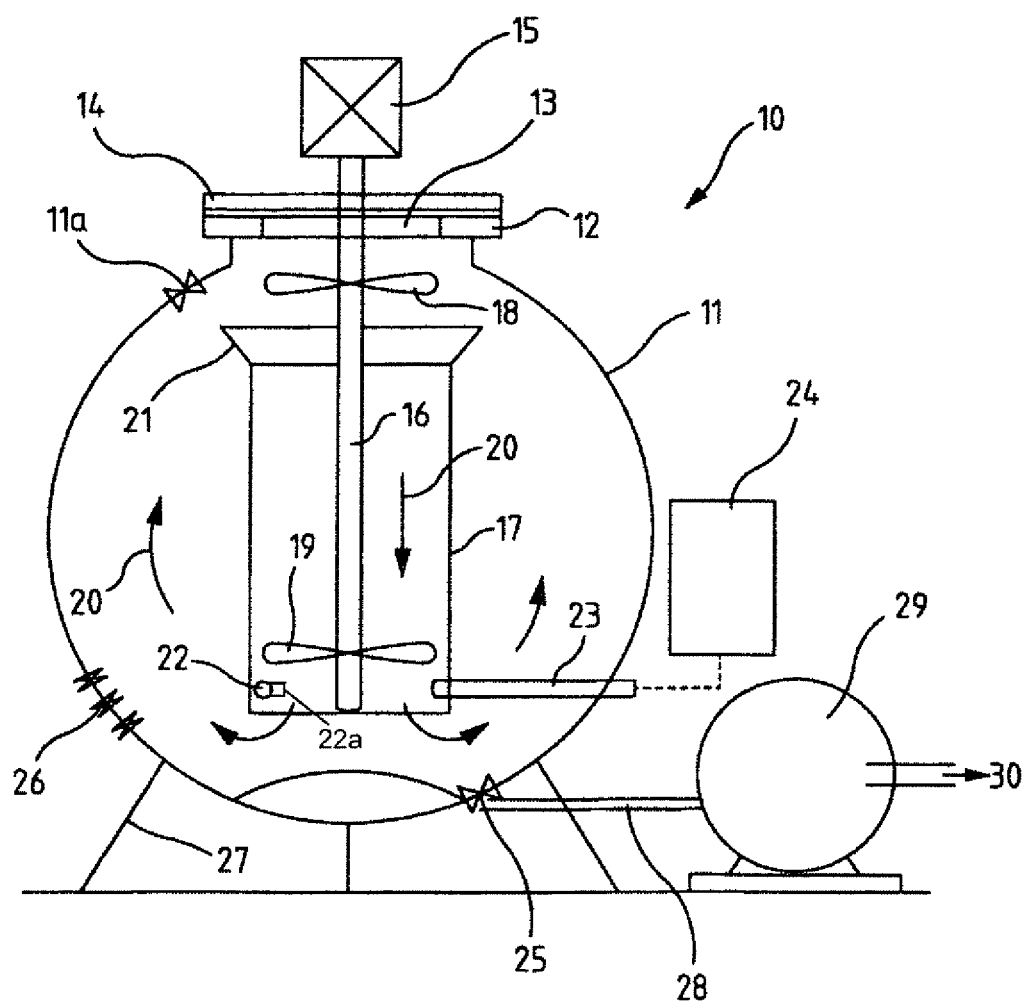
FIG. 1 shows a spherical closed ozonizing container with a vertical hollow-cylindrical fixture which is open on both sides, through which a rotatable agitator shaft passes, which has on both ends an associated agitator propeller.

The cleaning device 10 according to the invention illustrated in FIG. 1 is composed of a preferably spherical ozonizing container 11. The ozonizing container 11 may be filled with wastewater to be cleaned, for example liquid manure from agricultural operations or wastewater loaded with feces, through an inlet valve 11a. The ozonizing container 11 is preferably spherical so as to attain an optimal surface-to-volume ratio.

In the installed position, the spherical ozonizing container 11 has at the top a welding neck flange 12 with a manhole 13. The ozonizing container 11 may be inspected, as necessary, through the manhole 13.

The manhole 13 may be closed to the outside with a blind flange 14. An agitator drive 15, for example an electric motor, is attached on the blind flange 14. An agitator shaft 16, which extends in the installed position perpendicular through a hollow-cylindrical fixture 17 in the spherical ozonizing container 11, can be driven with the agitator drive 15.

The hollow-cylindrical fixture 17 has in the installed position at the top an upper agitator propeller 18 and in the installed position at the bottom a lower agitator propeller 19. The agitator propellers 18 and 19 generate in the hollow-cylindrical fixture 17 a flow 20 of the wastewater to be cleaned which extends from the top to the bottom. To support the flow 20, the hollow-cylindrical fixture 17 has at its top edge a funnel insert 21.

The hollow-cylindrical fixture 17 has in the installed position at the bottom a ring-shaped line 22 through which ozone can be blown in radially inwardly via nozzles 22a. The ozone reaches the ring-shaped line 22 from an external ozone generator 24 through an ozone supply line 23, from where the ozone is blown in against the flow 20. This causes optimal intermixing between the wastewater to be cleaned and the ozone. Control fittings 26 are provided for withdrawing samples.

Figure 3:
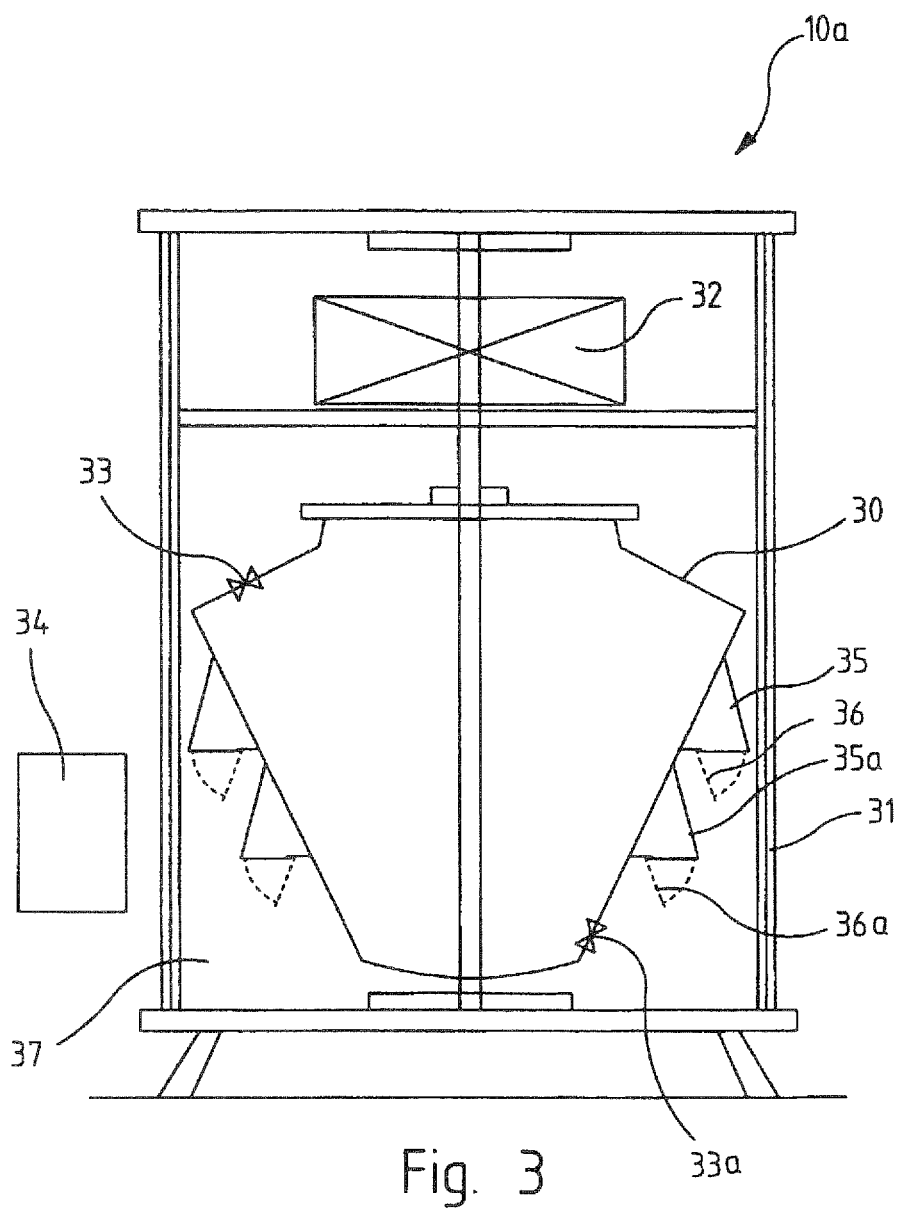
FIG. 3 shows a spherical closed material separating container, into which the wastewater that was previously treated with the ozone in the spherical closed ozonizing container can be pumped and centrifuged, wherein the flocculated particulate matter is centrifuged outwardly into capture bags and captured.
Figure 4:
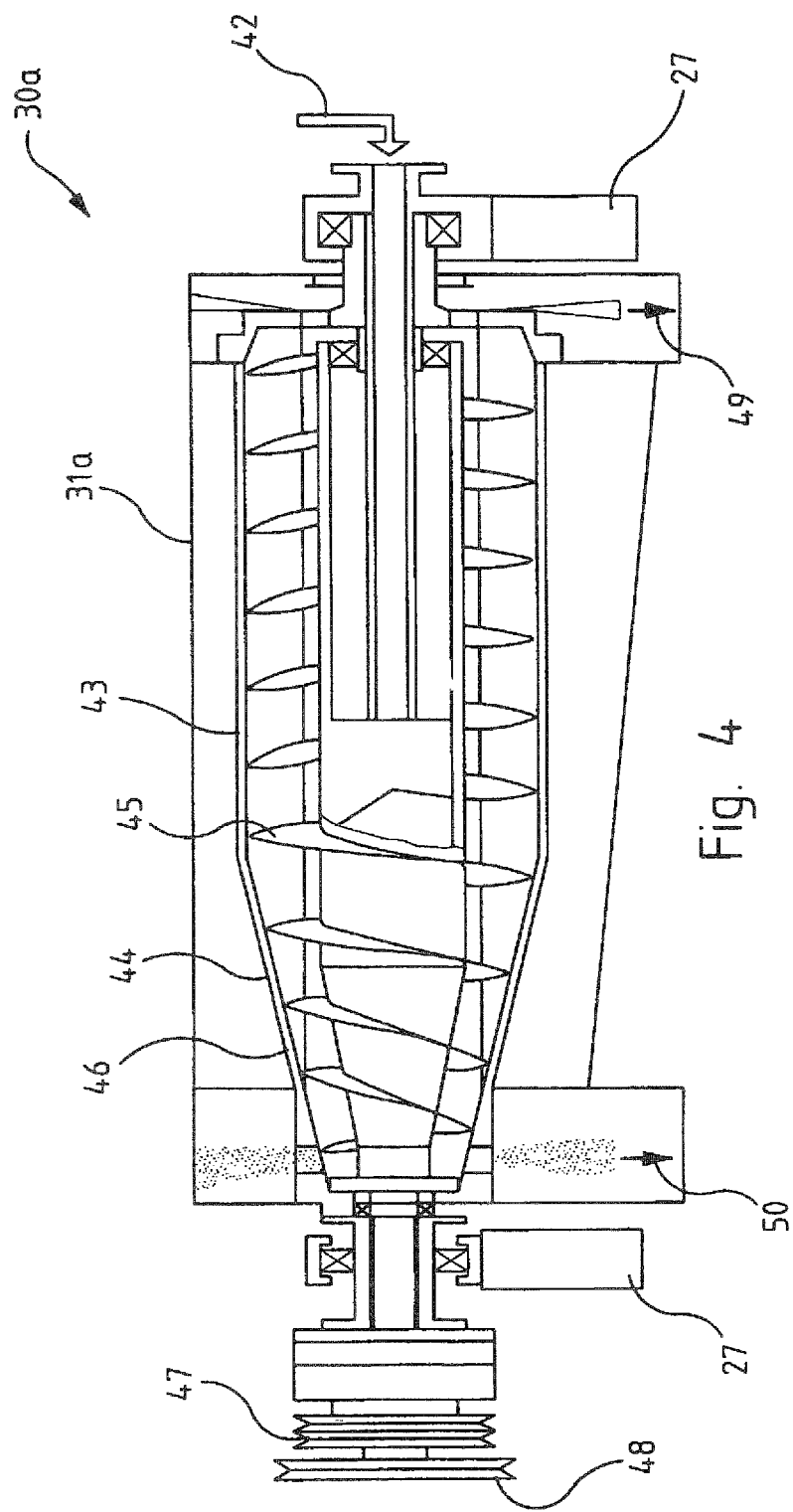
FIG. 4 shows a material separating container, with one half in form of a truncated cone and the other half in form of a cylinder, into which the wastewater that was previously treated with the ozone in the spherical closed ozonizing container can be pumped and centrifuged, wherein the flocculated particulate matter is centrifuged radially outwardly toward the container wall, where it can settle and be removed with a feed screw.

The spherical ozonizing container 11 rests on container supports 27 and includes a drain fixture 25 for draining. After ozonization, where the contaminants are neutralized and flocculated as particulate matter, the wastewater to be cleaned can be pumped from the spherical ozonizing container 11 with a siphoning pump 29 through a pump line 28 and transferred to a particle separation device 10a or 30a, as illustrated in FIGS. 3 and 4 below.

Figure 2:
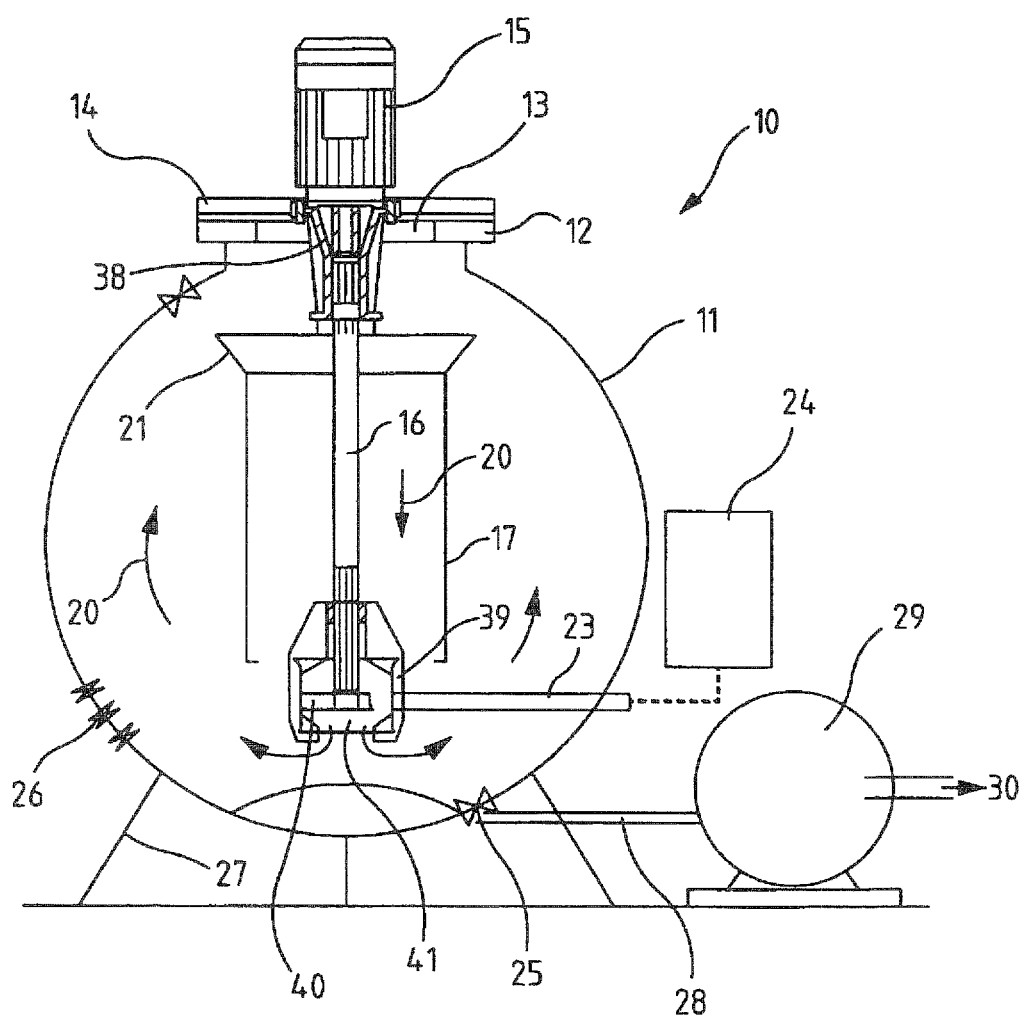
FIG. 2 shows a spherical closed ozonizing container according to FIG. 1, with a vertical hollow-cylindrical fixture which is open on both sides, with an agitator with a rotor that rapidly rotates in a stator arranged in the fixture.

In the embodiment according to FIG. 2, a stator 39 is arranged in the ozonizing container 11 on the bottom end of the agitator shaft 16. A fast rotating rotor 40 is arranged in the stator 39. The agitator shaft 16 is hereby supported at its top end in a bearing flange 38 and is driven by an agitator drive 15 in form of an electric motor.

The stator 39 has a rotor space which is open towards the bottom; the ozone feed line 23 terminates in the rotor space. The medium to be cleaned, namely wastewater or liquid manure from farming, it is not a homogeneous material and can contain solid lumped-together particulate matter islands of different size which either do not react at all with the ozone or only insufficiently.

The medium to be cleaned is therefore homogenized by the rotor 40 which rapidly rotates in the stator 39, while simultaneously ozone is introduced through the ozone feed line 23. The rotor 40 rotates with approximately 250 and 500 RPM, producing shearing forces high enough to dissolve and intermix the particulate matter islands.

The particulate separating device 10a illustrated in FIG. 3 is essentially comprised of an upright material separating container 30 which is arranged in an upright housing 31. The material separating container 30 is constructed according to the invention in form of a truncated cone, wherein the greater diameter of the truncated cone is in the installed position at the top. The material separating container 30 is provided with a centrifugal drive 32 and has an inlet valve 33 through which the medium to be cleaned, which arrives from the cleaning device 10 according to FIG. 1 and has already been ozonized, can be introduced.

After filling, the ozonized wastewater is set into a rapid rotary motion by the centrifugal drive 32. All process steps inside the material separating container 30 can be monitored with an external measuring station 34.

As a result of the rotation, the flocculated suspended particles are centrifuged radially outward, where they are captured in capture bags 35 and 35a and collected. The capture bags 35 and 35a, respectively, are distributed along the entire circumference of the truncated-cone-shaped material separating container 30. The capture bags 35 are located at the top in the region of the larger diameter and are provided with coarse sieves 36. The larger, because heavier particulate matter is transported outwardly first and farther during centrifuging, and collected in the upper catch bags 35 arranged in the region of the larger diameter.

The smaller and lighter particulate matter is moved outwardly less far and collected in the catch bags 35a which are provided underneath in the region of the small diameter. The lower catch bags 35a are here provided with fine sieves 36a. The flocculated particulate matter is fractioned due to the truncated-cone-shaped design of the material separating container 30.

After all particulate matter is removed from the cleaned wastewater, the cleaned wastewater can be disposed of through a drain valve 33a and, for example, returned again to the cleaning flow loop.

The cleaned wastewater can also be transported to an additional water treatment system where it is sufficiently cleaned and disinfected so that it can be used again, for example on a ship, as process water and/or drinking water.

The particulate matter captured in the capture bags 35 and 35a may be discharged, for example, into a storage space 37 provided in the housing 31 and intermediately stored until the time of final disposal. To facilitate emptying the catch bags 35 and 35a, the coarse sieves 36 and the fine sieves 36a are constructed as discharge flaps and can be opened discontinuously. The collected solids can be transported to an unillustrated incinerator for disposal.

The conventional material separating device 30a illustrated in FIG. 4 is essentially constructed of a horizontal a housing 31a with an inlet valve 42 for the medium to be cleaned. A receiving drum 46 which is rotatably supported on a container bearing 27 is disposed in the horizontal housing 31a. The receiving drum 46 is constructed of a cylindrical drum part 43 and a conical drum part 44.

An inlet valve 42 is arranged in the region of the cylindrical drum part 43. The cylindrical drum part transitions into the conical drum part 44 as a single piece.

A feed screw 45, which is operatively connected with the interior surface of the conical drum part 44, is arranged inside the receiving drum 46. The receiving drum 46 can be set into a rapid rotation by a drum drive 47, for example by an unillustrated electric motor. The rotation speed which is important for the material separation can be varied with a control drive 48.

After the material has been separated, the fluid can be drained through a drain valve 49. The relatively dry, solid suspended particles that were separated from the medium to be cleaned can be removed through a solid matter discharge port 50.

The invention claimed is:

1. A device for cleaning liquid media containing particulate matter in suspension, comprising:
a closed ozonizing container,
a vertical hollow-cylindrical fixture having a top and a bottom and being arranged in the closed ozonizing container,
a rotatable agitator shaft having two ends and being operatively connected to the fixture,
agitation means arranged on the two ends and cooperating with the agitator shaft, said agitation means producing in the vertical hollow-cylindrical fixture a flow directed in a flow direction from the top to the bottom,
a ring-shaped line having radially inwardly oriented nozzle openings arranged near the bottom,
ozone feed lines connected to the fixture for introducing ozone in opposition to the flow direction through the ring-shaped line into the closed ozonizing container,
a material separating container constructed in form of a truncated cone and arranged downstream of the ozonizing container and comprising catch bags comprising sieves, the catch bags being arranged outside the material separating container in a radial direction,
wherein the liquid media containing the particulate matter is, after being ozonized in the closed ozonizing container, subsequently pumped into and centrifuged in the material separating container.

2. The device of claim 1, further comprising
a stator arranged at a bottom end of the agitator shaft, and
a rotor arranged in the stator and homogenizing the liquid media containing the particulate matter to be cleaned.

3. The device of claim 2, wherein the agitation means are agitator propellers which are arranged at both ends the agitator shaft and produce a flow in the fixture.

4. The device of claim 3, wherein the agitator propellers produce in the fixture a flow having a vertical downward direction.

5. The device of claim 1, wherein the material separating container constructed in form of a truncated cone has a large diameter near the top and a small diameter near the bottom, wherein the sieves of the catch bags arranged near the top are coarse sieves and the sieves of the catch bags arranged near the bottom are fine sieves.

6. The device of claim 1, wherein the sieves are constructed as openable discharge flaps.

7. The device of claim 1, wherein the ozonizing container has a spherical shape.

* * * * *